United States Patent [19]

Rohrbaugh et al.

[11] Patent Number: 5,770,838
[45] Date of Patent: Jun. 23, 1998

[54] INDUCTION HEATERS TO IMPROVE TRANSITIONS IN CONTINUOUS HEATING SYSTEM, AND METHOD

[75] Inventors: David S. Rohrbaugh, Sellersville; Steven R. Peterson, Huntingdon Valley, both of Pa.

[73] Assignee: Drever Company, Huntingdon Valley, Pa.

[21] Appl. No.: 712,531

[22] Filed: Sep. 11, 1996

[51] Int. Cl.[6] .............................. H05B 6/06; H05B 6/14
[52] U.S. Cl. ......................... 219/645; 219/656; 219/662; 219/667; 146/568; 266/129
[58] Field of Search .................................. 219/645, 646, 219/635, 636, 656, 662, 665, 667; 146/567, 568, 576; 266/129

[56] References Cited

U.S. PATENT DOCUMENTS

| | | | |
|---|---|---|---|
| 1,981,631 | 11/1934 | Northrup | 219/667 |
| 2,123,776 | 7/1938 | Hansell | 219/656 |
| 2,504,440 | 4/1950 | Meiss | 219/645 |
| 2,902,572 | 9/1959 | Lackner et al. | 219/10.41 |
| 3,444,346 | 5/1969 | Russell et al. | 219/10.61 |
| 4,039,794 | 8/1977 | Kasper | 219/656 |
| 4,054,770 | 10/1977 | Jackson et al. | 219/10.61 |
| 4,093,839 | 6/1978 | Moliterno et al. | 219/656 |
| 4,239,483 | 12/1980 | Iida et al. | 432/8 |
| 4,420,667 | 12/1983 | Lewis | 219/656 |
| 4,585,916 | 4/1986 | Rich | 219/10.61 |
| 4,678,883 | 7/1987 | Saitoh et al. | 219/10.61 |
| 5,472,528 | 12/1995 | Boyer | 148/567 |
| 5,487,795 | 1/1996 | Kim et al. | 219/656 |

FOREIGN PATENT DOCUMENTS 2 688 802   9/1993   France .

*Primary Examiner*—Philip H. Leung
*Attorney, Agent, or Firm*—Woodcock Washburn Kurtz Mackiewicz & Norris LLP

[57] ABSTRACT

A heating system and method for heating a metal strip to within a predetermined temperature tolerance range while the metal strip serially travels through a heating system. The heating system has at least one preceding heating section, at least one induction heating section, and at least one following heating sections, with the heating sections being serially arranged. The metal strip is heated to below the Curie point of the metal strip in the preceding heating section. Next, the metal strip is heated to, at a maximum, approximately the Curie point in the induction heating section. Then, the metal strip is heated to above the Curie point and to within the predetermined temperature tolerance range in the following heating section.

26 Claims, 7 Drawing Sheets

INDUCTION HEATERS TO IMPROVE TRANSITIONS IN CONTINUOUS HEATING SYSTEM, AND METHOD

BACKGROUND OF THE INVENTION

1. Field of the Invention

This invention relates to the heating of metal strips passing through a continuous heating system. More specifically, this invention relates to the heating of metal strips to within predetermined temperature tolerance ranges.

2. Description of the Prior Art

Generally, continuous heating furnaces are used for continuously annealing or galvanizing steel strip, band, or plate, which shall be referred to collectively as "strip." Specific heating procedures are established to impart desired characteristics to the strip. Each heating procedure has a predetermined peak metal temperature tolerance range to which the strip should be heated within upon leaving the furnace, irrespective of the dimensions of the strip.

Such furnaces can be broadly classified into those that are heated electrically and those that are heated by burning gas. The gas-fired furnaces can be subclassified into the radiant-tube type and the direct-fired type. Considering energy efficiency, running cost, initial investment and other factors, the gas-fired furnaces may be much more advantageous than the electrically-heated furnaces.

When continuously heat-treating strips of different dimensions, it is a common practice to serially pass the strips through the furnace. Often, but not always, the strips are welded together before continuously feeding them through the furnace. The region between the strips is referred to as a transition. Transitions can be categorized as to changes in strip thickness, strip width, thermal cycle, strip speed, or any combination of the four previously mentioned parameters from one order, or coil, to the next. When transitions pass through the furnace system, special control techniques are required to change the furnace conditions due to the large thermal mass of the furnace system.

Prior art furnaces have been limited in the range of allowable transitions. If the transition is too large, the furnace will produce a large amount of strip which does not satisfy the tolerances (usually ±20° F.) on the desired peak metal temperature. This out of tolerance strip is generally scrap product because the physical properties of this strip will not be to specification.

The prior art discloses several techniques used to improve furnace performance for transitions. The simplest of these techniques is to use feedforward control to prepare the furnace for the incoming coil. This has typically been done with mathematical models which simulate the heat transfer between the furnace and the strip to predict optimal furnace conditions for the transitions. This method is helpful, but is still subject to the relatively sluggish response rate of a main fuel-fired or electrical resistance-heated furnace and the associated thermal mass.

Another prior art technique is to have a type of preheat system that can respond relatively rapidly, such as convection, direct-fired, transverse flux or induction. These units can then be used to add heat to one of the coils in the transition to produce a peak metal temperature that is not normally possible with the conditions that exist within the furnace at the time of the transition. All of these units have been installed at the entry to the main heating section and all have been used, in various forms, to improve the responsiveness of the process.

See U.S. Pat. No. 4,239,483 (Iida)(induction heaters). These units are generally used in conjunction with the previously mentioned modeling to broaden the range of transitions. However, the strip is still subject to the conditions of the furnace, resulting in the preheating section having a very limited impact on the peak metal temperature.

In theory, the ideal location for such a rapidly responding heating device would be where the strip exits the furnace so that the furnace does not limit the device's usefulness. However, this is not practical with the currently available technology. Most induction heaters are limited to raising the temperature of a strip to its Curie point, which is approximately 1300° F.–1400° F. As the typical peak metal temperature is higher than the Curie point, these induction heaters are not useful at the end of the furnace. The induction heaters that heat metal strip higher than the Curie point are not practical in continuous annealing due to very small coil openings and/or great losses in heating efficiencies. Transverse flux heaters can be used at these temperature ranges, but it is not practical from a physical viewpoint. Convection heating in this temperature range is also impractical from a mechanical and maintenance viewpoint. Direct-fired heaters cannot be used at the higher peak metal temperatures because of the tendency for oxidation of the strip surface.

Thus, a need exists for a way to reduce or eliminate out-of-specification metal strips that occur when transistions travel through the furnace.

SUMMARY OF THE INVENTION

The present invention is directed toward a continuous strip heating system and method of operation thereof, the heating system having induction heaters positioned between a plurality heating sections of a continuous strip heating system, wherein the inclusion of the induction heaters allows for less strip scrap while the heating system has its temperature changed to accommodate changes in dimensions and other heating requirements of the strip.

Accordingly, it is an object of the invention to provide a heating system and method for heating a metal strip to within a predetermined temperature tolerance range while the metal strip serially travels through a heating system. The heating system has at least one preceding heating section, at least one induction heating section, and at least one following heating section, with the heating sections being serially arranged. The metal strip is heated to below the Curie point of the metal strip in the preceding heating section. Next, the metal strip is heated to, at a maximum, approximately the Curie point in the induction heating section. Then, the metal strip is heated to above the Curie point and to within the predetermined temperature tolerance range in the following heating section.

Other and further objects and advantages will appear hereinafter.

DESCRIPTION OF THE PREFERRED EMBODIMENT(S)

Figure 1:
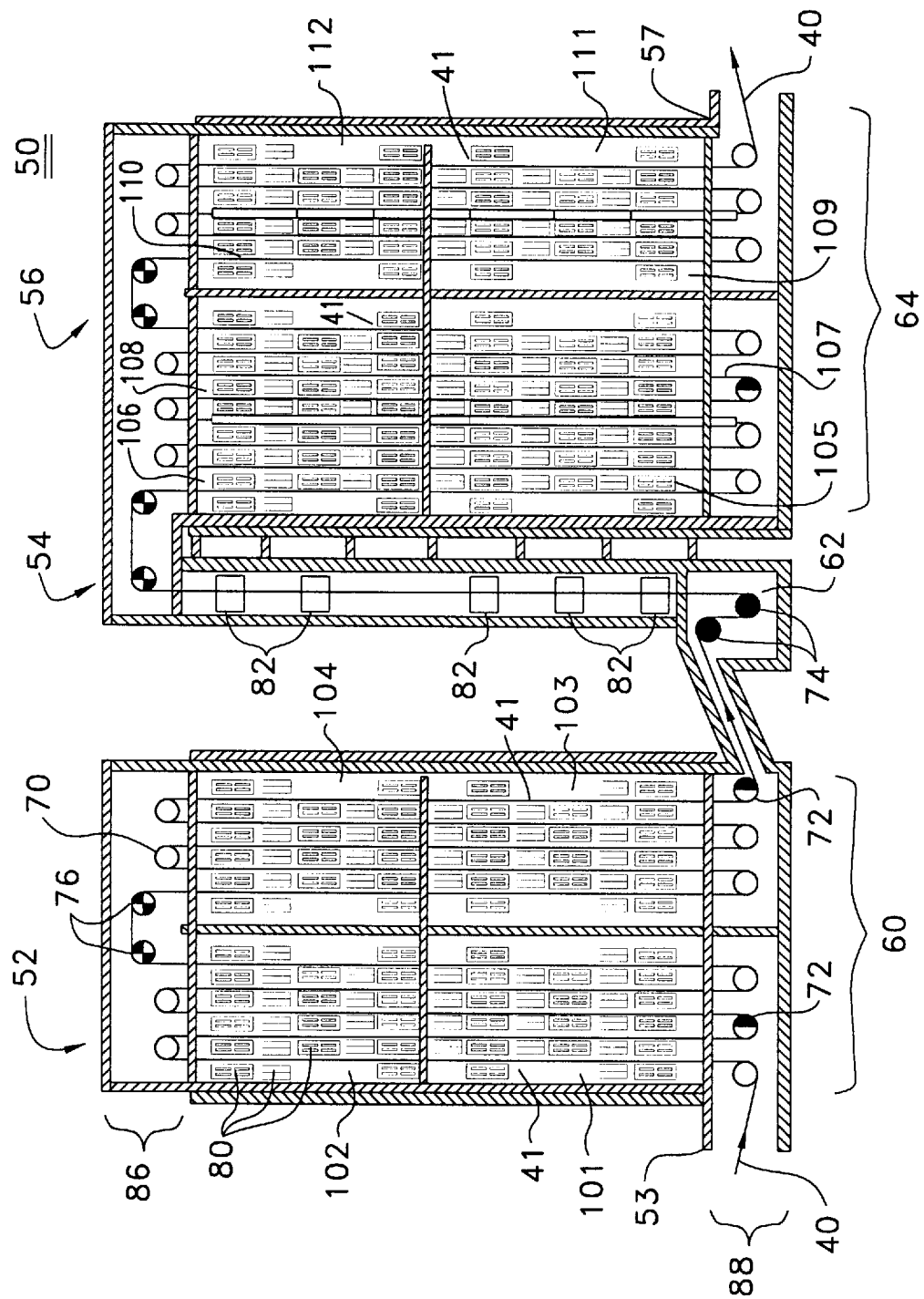
FIG. 1 is an elevation view of the heating system comprising an induction heating section between the preceding and following heating sections.

Referring to the drawings, wherein like numbers designate like components, FIG. 1 illustrates heating system 50, or furnace, for heating a continuously moving combined strip 40 to within a peak metal temperature tolerance range or some other predetermined temperature tolerance range. Heating system 50 is located upstream of a soaking section and downstream of a preheating section in a continuous steel strip annealing line. Other invention embodiments are useful in processes requiring heat treatment of a metal strip, such as continuous strip galvanizing lines or in continuous plate furnaces. The heating system 50 has a top section 86 and a bottom section 88 extending across a preceding heating section 52, an induction heating section 54, and a following heating section 56 arranged in series. Other embodiments of the invention have a plurality of preceding and/or following heating sections. Further embodiments embodiments of the invention have the heating sections 52–56 arranged vertically. Still further embodiments have the heating sections in a plurality of housings or in a single housing. These arrangements enables combined strip 40 to enter the preceding heating section 52 at entrance 53, pass through the three heating sections, and exit through following heating section exit 57.

The combined strip 40 travels through the heating sections 52, 54, and 56 in passes 60, 62, and 64 respectively. A pass is a space extending from either the top section 86 to the bottom section 88 or vice versa, through which the combined strip 40 passes. In the embodiment of FIG. 1, there are ten passes 60 in the preceding heating section 52, one pass 62 in the induction heating section 54, and thirteen passes 64 in the following heating section 56. While the passes in the embodiment of FIG. 1 are vertically oriented, other embodiments of the invention may have passes oriented in other directions, such as horizontal. Further embodiments of the invention may have a single horizontal pass extending from the entrance of the preceding heating section to the exit of the following heating section. In negotiating the passes, the combined strip 40 travels over rolls 70, tensiometer rolls 72, bridle rolls 74, and steering rolls 76, which are located in the top and bottom sections 86 and 88. While all of the rolls support the combined strip 40 as it travels through the passes, some rolls have additional purposes. Tensiometer rolls 72 measure the tension in the combined strip 40 while bridle rolls 74 change the tension in it. Steering rolls 76 control the direction of the combined strip 40.

Figure 2:
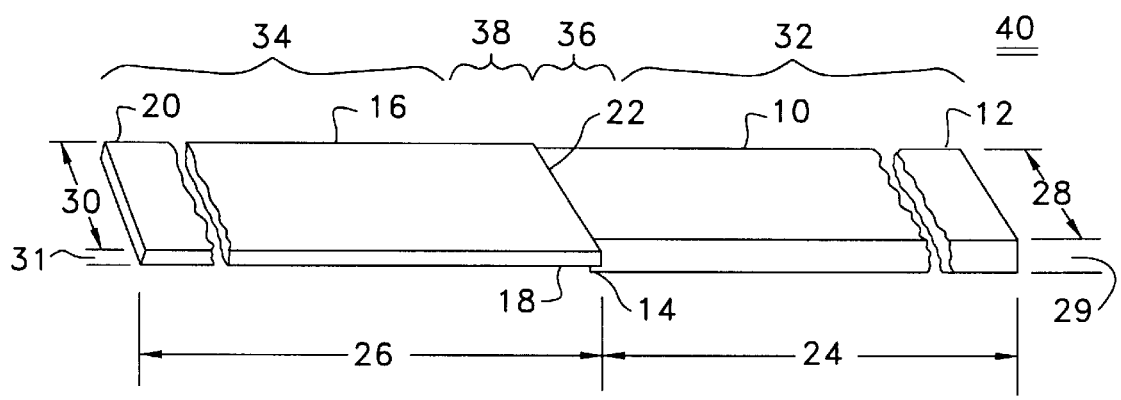
FIG. 2 is a perspective view of a combined strip comprising two strips of different dimensions.

Now referring to FIG. 2, combined strip 40, comprising a first strip 10 and a second strip 16, has been processed in the heating system 50. It is understood that "strip" refers to a length of metal that is, but not limited to, at least one strip, at least one band, or at least one plate. The first strip 10 has a front end 12 and a tail end 14. The second strip 16 has a front end 18 and a tail end 20. The tail end 14 of first strip 10 and the front end of the second strip 16 are welded together at a transition 22. In other embodiments of the invention, the first and second strips 10 and 16 may be attached by any other suitable means or may be unattached. In embodiments of the invention processing unattached strips, the strips are at least proximate to each other, with a region from the tail end 14 to the first end 16 being the transition 22. Lesser portions 36 and 38 of the first and second strips 10 and 16, respectively, are adjacent to the transition 22 and are the portions of the strips that were not heated to within approximately the peak metal temperature tolerance range. This results in the lesser portions 36 and 38 being out-of-specification material and, therefore, scrap. The remainder of first and second strips 10 and 16 are greater portions 32 and 34 of the strips, respectively. The greater portions 32 and 34 are within the peak metal temperature tolerance range and are inspecification material. A primary goal of the heating system 50 is to minimize the size of the lesser portions 36 and 38 and maximize the size of the greater portions 32 and 34, thus maximizing the production of in-specification material.

Figure 3:
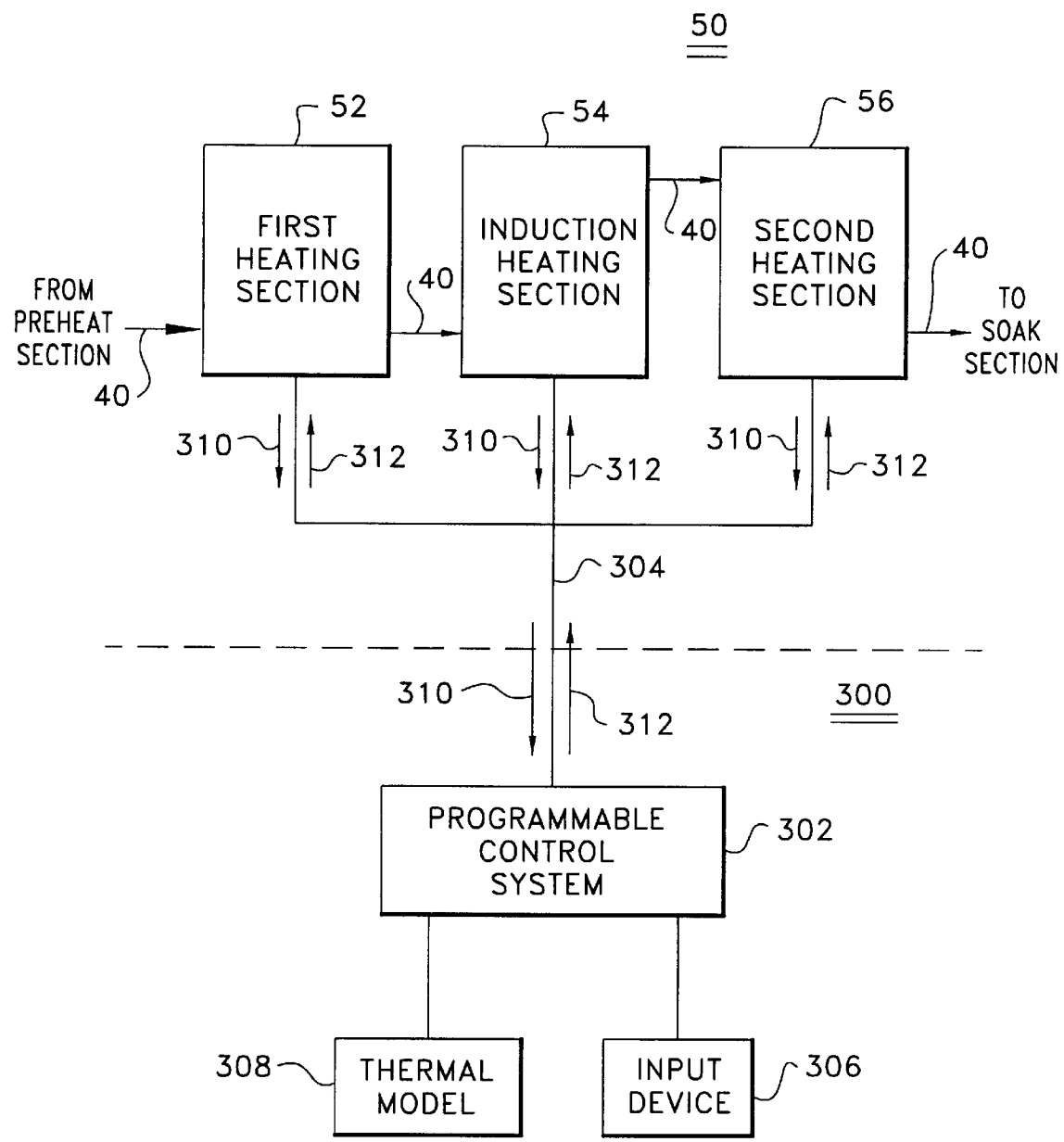
FIG. 3 is a schematic representation of the connection between the heating system and a programmable control means.

Now referring to FIG. 3, in the preferred embodiment of the invention a programmable control mechanism 300 directs the heating of the preceding heating section 52 and the following heating section 56 and the use of the induction heating section 54. In other embodiments of the invention, the control mechanism may not be programmable. The programmable control mechanism 300 directs the heating via a programmable control system 302 that is interconnected with the preceding heating section 52, the induction heating section 54, and the following heating section 56 through conduit 304 to direct the operations of the heating system 50. In other embodiments of the invention, a wireless transmission system (not shown) may be used in place of or in conjunction with conduit 304. Instrumentation in the heating system 50 measures at least a portion of the variables (discussed below) of the combined strip 40 and of the heating system 50 and generates variable signals 310. Conduit 304 sends the variable signals 310 from the heating sections to the programmable control system 302. Additional variables that are not measured by the instrumentation are determined by a heating system operator and are manually inputted into the programmable control system 302 via an input device 306.

There are numerous variables that are received by the programmable controller 302. Some of the variables for the first strip are length 24, width 28, and thickness 29. Some of the variables for the second strip are length 26, width 30, and thickness 31. Other important variables in heating the first and second strips 10 and 16 include the initial temperature of the strips, the strips' speed through the heating system 50, and the exit temperature of the strips. Instrumentation may be used to measure a portion of these variables, i.e., thermocouples, distance indicators, speed indicators, etc.

The heating system also has variables which impact the heating of the strip, such as the temperatures in different locations of the first and following heating sections 52 and 56. In the embodiment of FIG. 1, the first and following heating sections are divided into twelve combustion zones 101–112. Other embodiments of the invention may have more or less combustion zones. At least a thermocouple (not shown) located near the middle of each zone 101–112 measure the zone temperatures, generate a signal 310, and transmit that signal to the control system 302. The preferred embodiment of the invention has two or more thermocouples in each combustion zone. Other embodiments of the invention may have different variables.

The programmable control system 302 analyzes the variable signals 310 and the manually inputted variables in the context of a thermal model 308 to determine new operating parameters for heating system 50. The thermal model 308 is a mathematical model that simulates the heat transfer between the heating system 50 and the combined strip 40 and the results of changes in the operating conditions of the heating system to determine new operating parameters. After the analysis, the programmable control system 302 translates the new operating parameters into operating parameter signals 312 that are sent to the heating system 50 via the conduit 304 to direct the operations thereof. In other embodiments of the invention, the operating parameters are determined by a heating system operator who either manually, or via a control system, directs the operations of the heating system 50.

Figure 4:
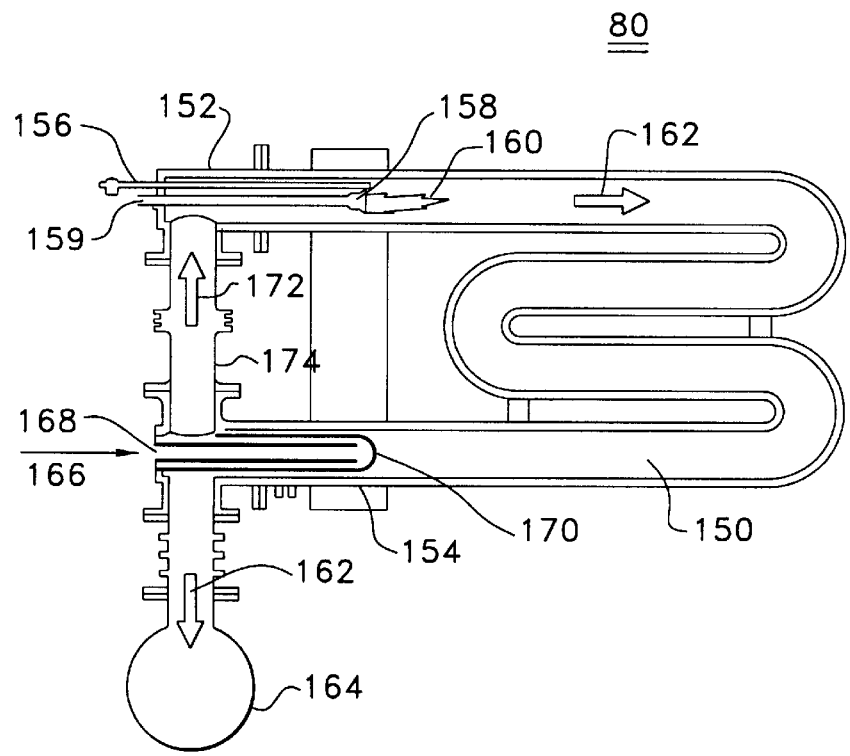
FIG. 4 is a sectional view of a W-type tube heater used in the heating sections.

The operating parameters of the heating system 50 direct different components of the heating system. Now referring to FIGS. 1 and 4, the heating components of the first and following heating sections 52 and 56 are gas-fired, W-type radiant tube heaters 80. These heaters are operated in an atmosphere of 0–100% hydrogen with the balance being nitrogen or other designated prepared atmospheric gas. A tube heater 80 is comprised of a hollow tube 150 formed in the shape and orientation of a sideways "W" with a top member 152 and a bottom member 154. A pilot burner 156 and a main gas inlet 158 extend into the top member, providing for gas 159 to enter the tube 150 and be ignited with a flame 160, producing combustion products 162. The pilot burner 156 is a premix-type pilot burner designed for automatic operation. The combustion products 162 travel through the interior of the tube 150 and out bottom member 154 into an exhaust gases collector 164. As the burners are suction-type burners, exhaust fans (not shown) draw the combustion products 162 into the exhaust gases collector 164. Air 166 enters the bottom member 154 through an air inlet 168. The air 166 is heated by the combustion products 162 through the use of a recuperator 170 in the bottom member 154, thereby generating 600° F. to 800° F. warmed air 172 in the preferred embodiment of the invention. The warmed air 172 travels to the top member 152 via a vertical hollow member 174 extending between the top and bottom members. The warmed air 172 is used in combusting gas 158. Other embodiments of the invention use other types, arrangements, and amounts of heaters.

The tube heaters 80 are arranged on both sides of the passes 60 and 64 to heat the combined strip 40 as it travels therethrough. The tube heaters 80 are oriented such that the tubes 150 are parallel to the combined strip 40 as it travels through the passes. The tube heaters 80 are arranged up to approximately eleven tube heaters high on each side of a pass. The placement and control of the tube heaters 80 is designed around the twelve independent combustion zones 101–112 in the first and following heating sections 52 and 56, as shown in FIG. 1.

The combustion products 162 may go through additional heat recovery steps after being collected by exhaust gases collector 164. In an embodiment of the invention, the combustion products from zones 101–112 exhaust into two separate exhaust systems. The first exhaust system exhausts zones 101–106 and the waste heat in this stream is used in the preheating section. The second exhaust system exhausts zones 107–112 and the soaking section in to a waste heat recovery system. Other embodiments of the invention may not recuperate the waste heat in the preheating zone nor in a waste heat recovery system.

The operating parameter signals 312 direct the rate of firing of the tube burners 80 by means of a control valve in the gas feed of each zone (not shown). The signals 312 also control a damper position to control negative pressure in exhaust gases collector 164 (not shown). Further, the signals 312 vary the speed of the exhaust fans to control the main suction pressure on the exhaust gases collector 164. All of these operations result in the control of the temperatures in the combustion zones 101–112 by the control mechanism 300 through the direction of the signals 312.

The operating parameter signals 312 also direct the components of the induction heating section 54, which are induction heaters 82. In the preferred embodiment of the invention, the induction heaters 82 are solenoid induction heaters. In the embodiment of the invention shown in FIG. 1, the induction heating section 54 is comprised of five induction heaters 82 through which combined strip 40 passes. In other embodiments of the invention, the induction heating section may be a single induction heater. Induction heaters are well known in the art and are described in U.S. Pat. Nos. 4,678,883 (Saitoh, et al.), 4,585,916 (Rich), 4,054,770 (Jackson, et al.), 3,444,346 (Russell, et al.), and 2,902,572 (Lackner, et al.), which are incorporated wherein in their entireties.

In induction heater 82, the combined strip 40 passes longitudinally through a magnetic field, inducing electrical currents therein. These induced electric currents heat the strip 40 as a result of the electric resistance of the strip. The magnetic field is generated by electrical current moving through coils in the induction heaters 82 positioned around the combined strip 40 (not shown). The control mechanism 300, through signals 312, directs electrical current to be supplied to the coils of the induction heaters 82. In an embodiment of the invention, the overall length of each coil is approximately 36 inches, with a minimum of approximately 24 inches of space between adjacent coils. The inside coil dimension is approximately 8 inches by approximately 100 inches. The induction heaters 82 are cooled by a closed-loop cooling water system designed to provide a 90° F. liquid cooling medium. The cooling system comprises an evaporative type cooling tower, a cooling tower fan, a cooling tower circulation pump, and a pumping and delivery system to provide the liquid cooling medium to the induction heaters 80. Other embodiments of the invention include different induction heaters, other configurations of induction heaters, and other means for cooling the induction heaters.

Prior to the first strip 10 entering the heating system 50, the programmable control mechanism 300 sends operating parameter signals 312 to the first and following heating sections 52 and 56 to heat the different zones in the sections to attain a first temperature profile. The first temperature profile is established by the temperatures of the combustion zones 101–112 at which the first strip 10 can exit the heating system 50 within a predetermined first temperature tolerance range. Likewise, a second temperature profile enables the second strip 16 to exit the heating system 50 within a second predetermined temperature tolerance range. The temperature profiles are established in the first and following heating sections 52 and 56 and not the induction heating section 54 because first and following heating sections transfer heat to the strip and the heating section, which allow for temperature measurements in the heating sections and, therefore, a temperature profile which is indicative of the heat transfer to the strip in a specific zone. As the induction heaters heat the strip directly, the temperature in the induction section is not indicative of the amount of heat transfer to the metal strip and does not constitute a part of the temperature profiles established by the control mechanism 300.

However, the programmable control mechanism 300 cannot direct the heating system 50, or more specifically the first and following heating section 52 and 56, to transition between the two temperature profiles instantaneously. As long as the variables of the strips do not change appreciably, there is little need for the programmable control mechanism 300 to direct the combustion zones 101–112 to make quick changes in the temperature profile. However, the large thermal masses of the heating sections restrict the speed at which the programmable control mechanism 300 can transition the combustion zones between the two temperature profiles. The more drastic the differences in the first strip variables and the second strip variables, the greater the difference in the two temperature profiles and the slower the transition.

While the programmable control mechanism 300 is transitioning the heating system 50 between the first and second temperature profile, some of the first strip 10 and the second strip 16 exiting the heating system are not within the predetermined first or second temperature tolerance range, respectively, thereby creating relatively large lesser portions 36 and 38 and leading to more scrap strip material.

However, the programmable control mechanism 300 can direct the induction heaters 82 to quickly heat the combined strip 40, but with much higher energy costs compared to the tube heaters 80. This rapid heating is useful in supplementing the heating of the combined strip while the programmable control mechanism 300 is transitioning the heating system 50 between the two temperature profiles. This supplemental heating by the induction heating section 54 results in reduced sizes or elimination of the lesser portions 36 and 38 and lowered or eliminated amounts of out-of-specification material.

When the first strip 10 requires a hotter temperature profile than the second strip 16, the programmable control mechanism 300 starts transitioning the heating system 50 to the cooler, second temperature profile while the first strip 10 is still passing therethrough. To compensate for the increasingly cooler temperature profile of the heating system 50 and, therefore, its capability to completely heat the strip, the programmable control mechanism 300 directs the induction heating section 54 to boost the temperature of the first strip 10 so that it still exits the heating system 50 within the predetermined first temperature tolerance range. Ideally, when the transition 22 passes through the heating system 50, the programmable control mechanism 300 has completed transitioning the system between the first and second temperature profile, thereby eliminating the lesser portions 36 and 38. In practice, the lesser portions 36 and 38 may only be reduced.

When the first strip 10 requires a cooler temperature profile than the second strip 16, the programmable control mechanism 300 starts transitioning the heating system 50 to the hotter, second temperature profile while the first strip 10 is still passing therethrough. As the transition 22 passes through the heating system, the programmable control mechanism 300 supplements the heating of the second strip 16 with the induction heating section 54 until the second temperature profile is attained. This will reduce or eliminate out-ofspecification material, resulting in a minimization or an elimination of the lesser portions 36 and 38 of the first and second strips 10 and 16.

Figure 5:
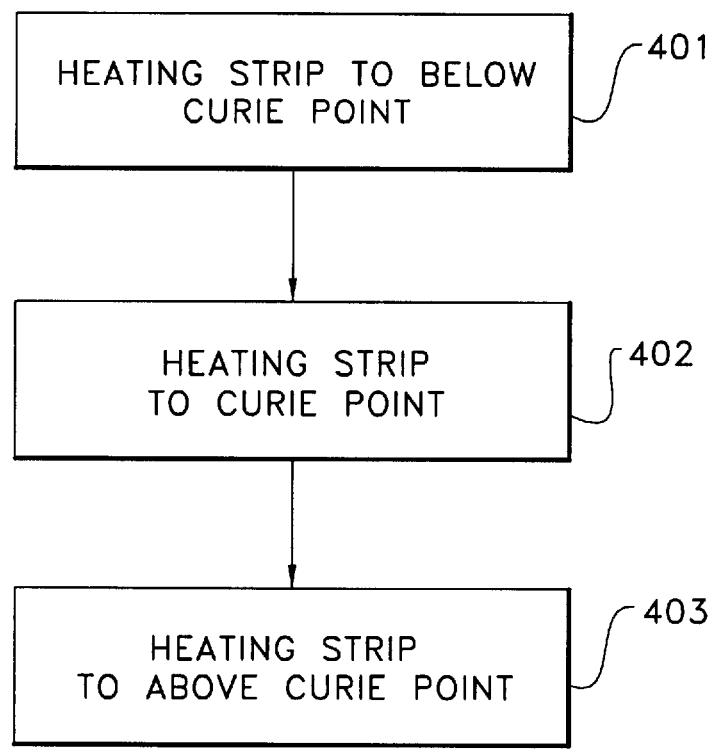
FIG. 5 is a flow chart of a method to heat a metal strip in a heating system comprising an induction heating section.

The induction heating section 54 is limited to raising the temperature of the combined strip to the metal's Curie point, which is approximately 1300° F. to 1400° F. for steel. However, the combined strip 40 requires a peak metal temperature of higher than the Curie point upon exiting the following heating section 56. Referring to FIG. 5, therefore, an aspect of the invention involves heating a metal strip to within a predetermined temperature tolerance range. The metal strip is serially traveling through a heating system 50 along a path 41 through at least one preceding heating section 52, at least one induction heating section 54, and at least one following heating section 56, with the heating sections being serially arranged as shown in FIG. 1. Typically, the length of the path 41 through the preceding heating section 52 is between approximately 40% to 50% of the length of the path through the entire heating system 50. In the first step 401, the metal strip is heated to below the Curie point in the preceding heating section. In the next step 402, the metal strip is heated to a maximum of approximately the Curie point in the induction heating section. In the following step 403, the metal strip is heated to above the Curie point in the following heating section. In the preferred embodiment of the invention, the metal strip is heated to approximately the Curie point in the induction heating section in step 402. As stated previously, the heating system may be located downstream of a preheating section and upstream of a soaking section in a continuous strip annealing line, in a continuous strip galvanizing line, or be in another process.

Another aspect of the invention is optimally locating the induction heating section 54 within heating system 50 to have a flexible and efficient heating system 50. The induction heating section's location is dictated by where being able to rapidly raise the combined strip temperature to the Curie point would be most efficient in continually producing combined strip 40 within the peak metal temperature tolerance range and, therefore, minimizing the size of the lesser portions 36 and 38 of the combined strip 40.

Figure 6:
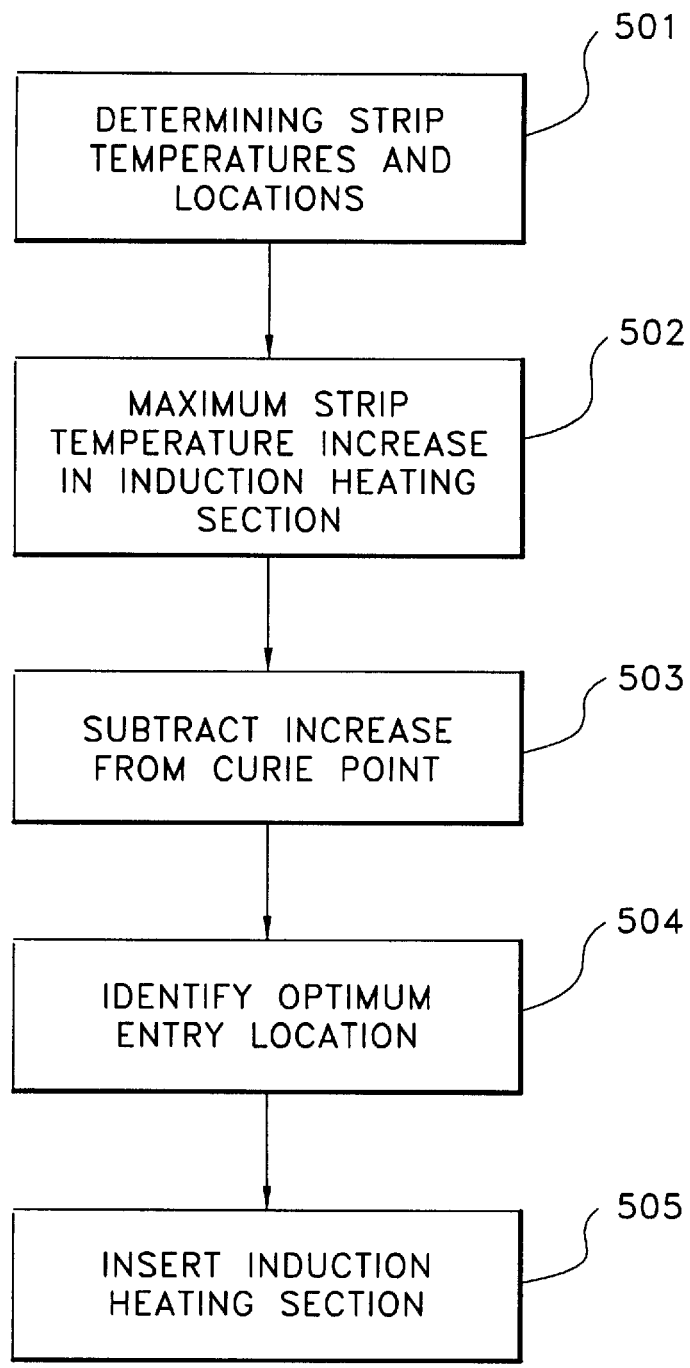
FIG. 6 is a flow chart of a method to optimally locate an induction heating section in a heating system.

Referring now to FIG. 6, the determination of the location of the induction heating section is based on a design metal strip serially traveling at a design speed through the serially arranged heating sections in a pre-inductionheating-section heating system (not shown) is performed as follows. The first step 501 is to determine a plurality of design strip temperatures at a plurality of pre-induction-heating-section heating system locations, respectively. This determination may be accomplished in any suitable manner, including taking strip temperature measurements in the actual, or a similar, system or calculating theoretical temperatures for each location based on a mathematical model of the system. The next step 402 is to determine a maximum design metal strip temperature increase attainable by the design metal strip traveling through the induction heating section at the design speed. The following step 503 is to subtract the maximum design metal strip temperature increase from the Curie point of the design metal strip, thereby defining an optimum design metal strip entry temperature. The succeeding step 504 is to determine a specific system location that has a corresponding strip temperature approximately equal to the optimum design metal strip entry temperature, thereby identifying an optimum design metal strip entry location of the induction heating section. The next step 505 is to insert the induction heating section between two adjacent heating sections and proximate to the optimum design metal strip entry location. The induction heating section may be inserted either before or after the optimum design metal strip entry location, depending on how the heating sections may be separated to accommodate the induction heating section. Preferably, the sections upstream of the induction heating section, also known as the preceding heating sections, comprise approximately 40% to 50% of the heating system.

In the preferred embodiment of the invention the preceding heating section 52 comprises approximately 40% to approximately 50% of the heating system 50, and is followed by the induction heating section 54 and the following heating section 56.

EXAMPLE

The first strip 10 is a steel strip of 0.047" thickness and 60" width. The second strip 16 is of 0.030" thickness and 60" width. Both of these strips have a peak metal temperature tolerance range of 1550° F. ±20° F. for the strips to be in-specification. However, first strip 10 requires more heat input to raise its temperature to 1550° F. than second strip 16 due to its greater mass per length.

Figure 7:
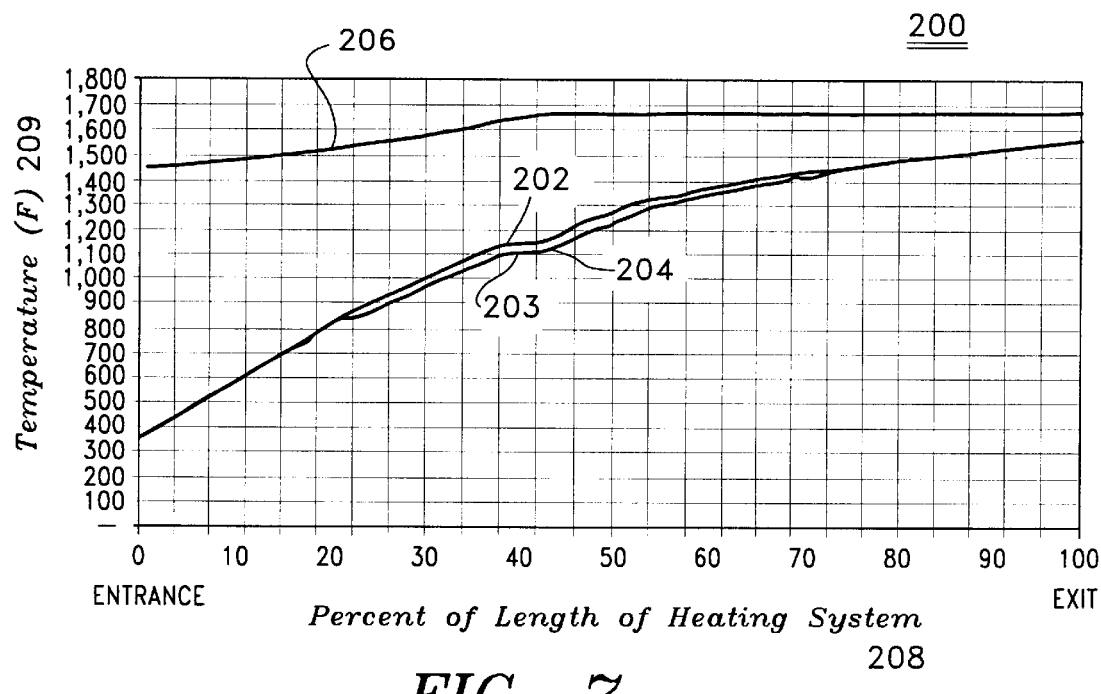
FIGS. 7 through 10 are graphs of the temperatures of the heating system during the changing of the temperature of the heating system to accommodate a change in the strip's dimensions.

Now referring to FIG. 7, a graph 200 depicts a steady state heating condition of heating system 50 with the first strip 10 passing through it. On the horizontal axis 208, the percent of the length of the heating system is marked off, while the vertical axis 209 marks off temperature. The graph 200 has a first strip temperature curve 202 of the first strip 10, an ideal temperature curve 204, and a heating system temperature curve 206. The first strip temperature curve 202 is a plot of the actual temperature of the first strip at a plurality of locations in the heating system. The ideal temperature curve 204 is a plot of the ideal temperatures of first strip at a plurality of locations in the heating system. The heating system temperature curve 206 is a plot of the temperatures of the heating system at a plurality of locations in the heating system.

The heating system temperature curve 206 is 1480° F. at the entrance of the heating system and 1680° F. at the exit. The first strip and ideal temperature curves 202 and 204 are nearly superimposed, with an initial temperature of 350° F. and a peak metal temperature of 1550° F. Note that there is a flat portion 203 of the curves 202 and 204 near the middle of the heating system. The flat portion 203 corresponds to a specific location of the induction heating section 54 in the heating system which is approximately 40% of the way through the heating system. All the location preceding the induction heating section are in the preceding heating section 52 and all locations following the induction the induction heating section are in the following heating sections 56. As the induction heating section is not in use, there is no temperature change for either the actual strip or the ideal strip at the flat portion 203.

The heating system temperature curve 206 is similar to the first temperature profile. However, the heating system temperature curve 206 depicts the heating system temperatures at different locations in the heating system. The first temperature profile is distinguishable from curve 206 in that the profile is the temperatures of the heating zones 101–112 in the heating system 50 that enable the first strip 10 to be heated to within the predetermined first temperature tolerance range.

Figure 8:
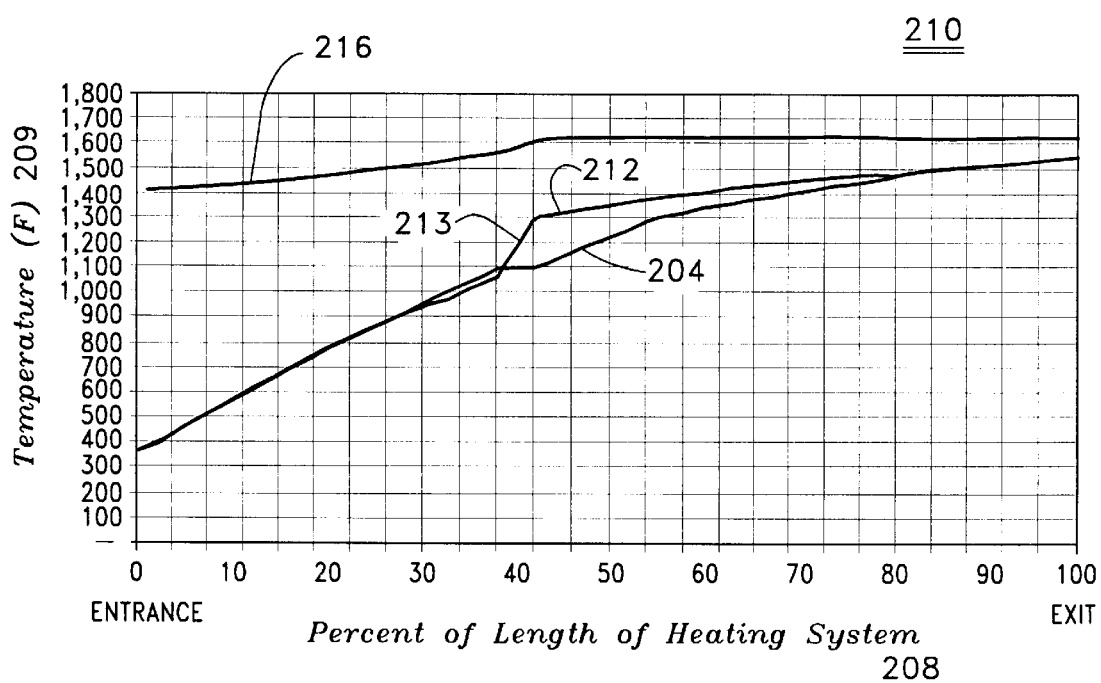

Now referring to FIG. 8, a graph 210 depicts the heating system 50 as the programmable control mechanism 300 starts to transition the temperature profile in anticipation of the second strip 16. Graph 210 has a first strip temperature curve 212, an ideal temperature curve 204, a heating system temperature curve 216, and the same axes 208 and 209 as graph 200 in FIG. 5, which are analogous to the curves in the graph 200.

The second strip 16, being significantly thinner, requires lower temperatures in preceding and following heating sections 52 and 56 to attain a peak metal temperature in the range of 1550° F. Therefore, those heating sections are starting to cool down, as shown by the system heating temperature curve 216 being only 1400° F. at the entrance and only 1620° F. at the exit. However, as strip 10 is still passing through, the induction heating section 54 is turned on, raising the first strip temperature curve 212 from 1150° F. to 1300° F. at shown at a portion 213 of the curve. Using the induction heating section 54 allows the exiting temperature of the first strip 10 to be an inspecification 1540° F.

Figure 9:
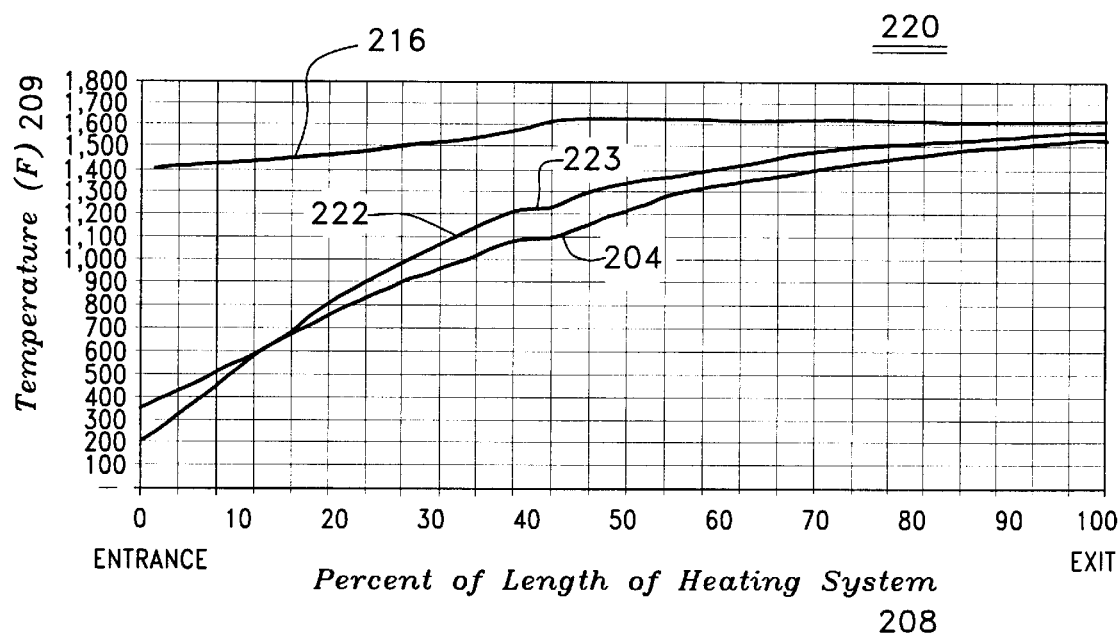

Now referring to FIG. 9, graph 220 depicts the heating system 50 after transition 22 passes through the heating system 50 but before the heating system reaches steady state. Graph 220 has a second strip temperature curve 222, and ideal temperature curve 204, a heating system temperature curve 216, and the axes 208 and 209, which are analogous to the curves in the graphs 200 and 210.

Being thinner, the second strip temperature 222 rises quickly from 200° F. to 1200° F. in the first approximately 40% of the heating system. Since the induction heaters 80 are turned off, the second strip temperature curve 222 is flat at a portion 223, which corresponds to the induction heating section 54. The curve 222 continues to climb to an exit temperature of 1570° F., which is within specification. In this example, the size of the lesser portions 36 and 38 were essentially eliminated. In other transitions, the sizes of the lesser portions only be reduced.

Figure 10:
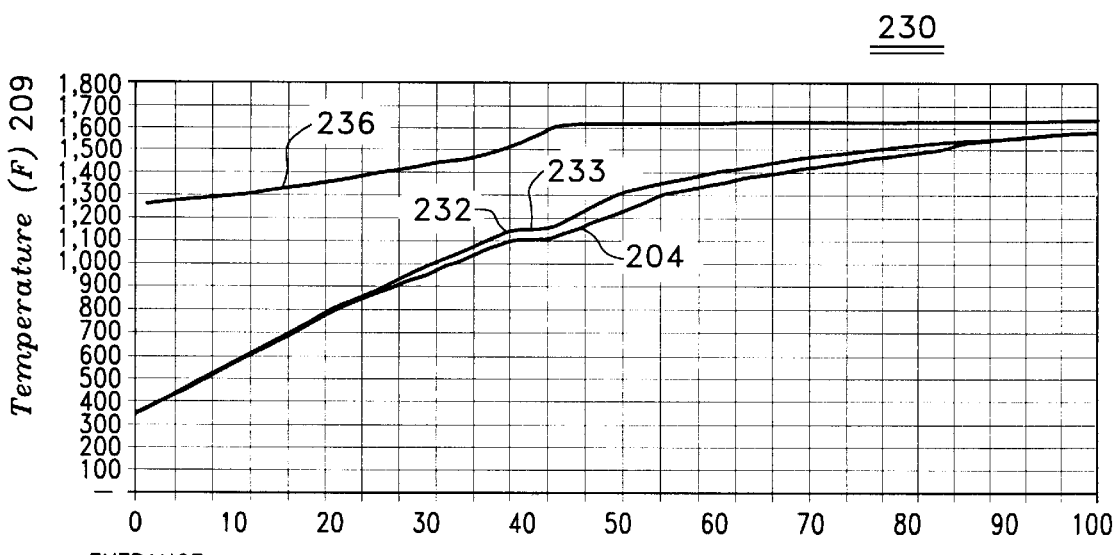

Now referring to FIG. 10, graph 230 depicts a heating system 50 at a steady state with the second strip 16 passing through it. Graph 230 has a second strip temperature curve 232, an ideal temperature curve 204, a heating system temperature curve 236, and the axes 208 and 209, which are analogous to the curves in the graphs 200, 210, 220.

The heating system temperature curve 236 is lower than the curves 206 and 216 as the second strip 16 requires less heat input than the first strip 10 due to its relative thinness. The temperature of the curve 236 is 1280° F. at the entrance to the heating system, compared to 1480° F. for the curve 206. Likewise, the temperature of the curve 236 is 1600° F. at the exit of the heating system, compared to 1680° F. for the curve 206. Since the induction heaters 80 are turned off, the second strip temperature curve 232 is flat at a portion 233 which corresponds with the location of the induction heating section 54.

The heating system temperature curve 236 is similar to the second temperature profile. However, the heating system temperature curve 236 depicts the heating system temperatures different locations in the heating system. The second temperature profile is distinguishable from the curve 236 in that the profile is the temperatures of the heating zones 101–112 in the heating system 50 that enable the second strip 16 to be heated to within the predetermined second temperature tolerance range.

Therefore, by placing the induction heating section 54 between the first and following heating sections 52 and 56 of a heating system 50, a greater percentage of the combined strip 40 exits the heating system 50 within the peak metal temperature tolerance range, thereby minimizing the lesser portions 36 and 38 of the combined strip. Other embodiments of the invention may heat a strip of more than two strips.

The present invention may be embodied in other specific forms without departing from the spirit or essential attributes thereof and, accordingly, reference should be made to the appended claims, rather than to the foregoing specification, as indicating the scope of the invention.

We claim:

1. A method of heating a metal strip to within a predetermined temperature tolerance range while the metal strip serially travels through a path in a heating system, the method comprising the steps of:

providing a heating system comprising at least one preceding heating section, at least one induction heating section, and at least one following heating section which are serially arranged;

locating the heating system downstream of a preheating section and upstream of a soaking section in a continuous strip annealing line, in a continuous strip galvanizing line, or in a continuous plate furnace;

heating the metal strip to below the Curie point in the preceding heating section;

heating the metal strip to a maximum of approximately the Curie point; and heating the metal strip to above the Curie point.

2. The method of claim 1, wherein the path has a length and a portion that extends through the preceding heating section, the portion having a length of approximately 40% to 50% of the length of the path.

3. A method of optimally locating an induction heating section in a pre-induction-heating-section heating system comprised of a plurality of serially arranged heating sections for heating a design metal strip serially traveling at a design speed therethrough along a path, comprising the steps of:

a) determining a plurality of strip temperatures at a plurality of system locations in the pre-induction-heating-section heating system, respectively;

b) determining a maximum design metal strip temperature increase attainable by the design metal strip traveling through the induction heating section at the design speed;

c) subtracting the maximum design metal strip temperature increase from a Curie point of the design metal strip, thereby defining an optimum design metal strip entry temperature;

d) determining a specific system location that has a corresponding strip temperature approximately equal to the optimum design metal strip entry temperature, thereby identifying an optimum design metal strip entry location; and e) inserting the induction heating section between two adjacent heating sections and proximate to the optimum design metal strip entry location.

4. The method of claim 3, further comprising the step of inserting the induction heating section before or after the optimum design metal strip entry location.

5. The method of claim 3, further comprising the step of inserting the induction heating section after one or more preceding heating sections of the heating system, wherein the path has a length and a portion that extends through the preceding heating section, the portion having a length of approximately 40% to 50% of the length of the path after inserting the induction heating section therein.

6. A method of heating a first and a second metal strip to within a predetermined first and second temperature tolerance range, respectively, each metal strip having a beginning portion, an ending portion, a front edge and a tail edge, the tail edge of the first metal strip being at least proximate to the front edge of the second metal strip, comprising the steps of:

a) providing a heating system comprising at least one preceding heating section, an induction heating section, and at least one following heating section serially arranged;

b) serially passing the first and second metal strips through the heating system;

c) while the beginning portion of the first metal strip is passing through the heating system, heating the preceding and following heating sections to a first temperature profile;

d) while the first metal strip ending portion and the second metal strip beginning portion are passing through the heating system, transitioning the heating of the preceding and following heating sections to attain a second temperature profile therein, including supplementing the heating of first metal strip ending portion and/or the second metal strip beginning portion with the induction heating section; and e) while the ending portion of the second metal strip is passing through the heating system, heating the preceding and following heating sections to the second temperature profile.

7. The method of claim 6, wherein the the tail edge of the first metal strip being attached to the front edge of the second metal strip.

8. The method of claim 7, further comprising the steps of:

a) inputting first metal strip variables, second metal strip variables, and heating system variables into a control system; and b) directing the operation of the preceding heating section, the induction heating section, and following heating section based on the predetermined first and second temperatures, a thermal model, the first metal strip variables, the second metal strip variables, and the heating system variables with the control system.

9. The method of claim 8, wherein the directing and/or the inputting steps are at least partially performed by a heating system operator.

10. The method of claim 8, wherein:

a) the first metal strip variables comprise length, width, thickness, strip speed through the heating system, initial strip temperature and final strip temperature;

b) the second metal strip variables comprise length, width, thickness, strip speed through the heating system, initial strip temperature and final strip temperature; and c) the heating system variables comprise an actual temperature profile of the preceding and following heating sections.

11. The method of claim 10, wherein the inputting step further comprises the steps of:

a) measuring at least a portion of the first metal strip variables, at least a portion of the second metal strip variables, and at least a portion of the heating system variables with instrumentation;

b) generating variable signals therefrom; and c) transmitting the variable signals to the control system.

12. The method of claim 9, wherein the serially passing step further comprises passing the first and second metal strips serially through;

a) a plurality of heaters arranged in passes in the preceding heating section;

b) at least an induction heater arranged in at least a pass; and c) a plurality of heaters arranged in passes in the following heating section.

13. The method of claim 12, wherein the passes are vertically or horizontally oriented.

14. The method of claim 12, wherein the heaters of the preceding and following heating sections are gas-fired W-type radiant tubes.

15. The method of claim 7, further comprising the step of passing the first and second metal strips through a soaking section of a continuous strip annealing line after serially passing the first and second metal strips through the heating system step.

16. A heating system for heating a first and a second metal strip to within a predetermined first and second temperature tolerance range, respectively, each metal strip having a beginning portion, an ending portion, a front edge and a tail edge, the tail edge of the first metal strip being at least proximate to the front edge of the second metal strip, comprising:

a) at least one preceding heating section;
b) an induction heating section;
c) at least one following heating section, wherein the heating sections are serially arranged to enable the first and second metal strips to serially pass therethrough; and
d) a metal strip temperature control mechanism connected to the first, induction, and following heating sections for:
  (i) attaining a first temperature profile in the preceding and following heating sections;
  (ii) attaining a second temperature profile in the preceding and following heating sections; and
  (iii) supplementally heating the first metal strip ending portion and/or the second metal strip beginning portion in the induction heating section while transitioning the preceding and following heating sections between the first and second temperature profiles.

17. The heating system of claim 16, wherein the the tail edge of the first metal strip being attached to the front edge of the second metal strip.

18. The heating system of claim 17, wherein the metal strip temperature control mechanism comprises:

a) inputting means for inputting first metal strip variables, second metal strip variables, and heating system variables into a control system; and
b) a thermal model; wherein, the control system directs the operation of the heating sections based on the predetermined first and second temperatures, the thermal model, first metal strip variables, second metal strip variables, and heating system variables.

19. The heating system of claim 18, wherein:

a) the first metal strip variables comprise length, width, thickness, strip speed through the heating system, initial strip temperature and final strip temperature of the first metal strip;
b) the second metal strip variables comprise length, width, thickness, strip speed through the heating system, initial strip temperature and final strip temperature of the second metal strip; and
c) the heating system variables comprise an actual temperature profile of the preceding and following heating sections.

20. The heating system of claim 19, wherein:

a) the preceding and following heating sections comprise a plurality of heaters arranged in passes;
b) the induction heating section comprises at least an induction heater arranged in at least a pass; and
c) the heating section passes are serially arranged to enable the first and second metal strips to pass serially therethrough.

21. The heating system of claim 20, wherein the passes are vertically or horizontally oriented.

22. The system of claim 21, wherein the heaters of the preceding and following heating sections are gas-fired, W-type radiant tubes.

23. The heating system of claim 22, wherein:

a) the inputting means comprises instrumentation for measuring at least a portion of the first metal strip variables, at least a portion of the second metal strip variables, and at least a portion of the heating system variables, generating variable signals therefrom, and sending the variable signals to the control system; and
b) the control system comprises means for receiving the variable signals.

24. The heating system of claim 18, wherein the control system is programmable.

25. The heating system of claim 17, wherein the heating system is located:

a) downstream of a preheating section and upstream of a soaking section in a continuous strip annealing line;
b) in a continuous strip galvanizing line; or
c) in a continuous plate furnace.

26. The heating system of claim 17, wherein the metal strip temperature control mechanism is at least partially controllable by a heating system operator.

* * * * *